United States Patent
Sütthoff et al.

(10) Patent No.: US 8,602,354 B2
(45) Date of Patent: Dec. 10, 2013

(54) ERGONOMIC AND SPACE-SAVING ARRANGEMENT OF MONUMENTS UNDERNEATH A REST COMPARTMENT IN AN AIRCRAFT

(75) Inventors: Thomas Sütthoff, Hamburg (DE); Matthias Breuer, Hamburg (DE); Felix Helfrich, Hamburg (DE)

(73) Assignee: Airbus Operations GmbH (DE)

( * ) Notice: Subject to any disclaimer, the term of this patent is extended or adjusted under 35 U.S.C. 154(b) by 467 days.

(21) Appl. No.: 12/934,377

(22) PCT Filed: Mar. 11, 2009

(86) PCT No.: PCT/EP2009/052861
§ 371 (c)(1),
(2), (4) Date: Dec. 1, 2010

(87) PCT Pub. No.: WO2009/118242
PCT Pub. Date: Oct. 1, 2009

(65) Prior Publication Data
US 2011/0139930 A1    Jun. 16, 2011

Related U.S. Application Data

(60) Provisional application No. 61/070,892, filed on Mar. 26, 2008.

(30) Foreign Application Priority Data

Mar. 26, 2008    (DE) .......................... 10 2008 015 788

(51) Int. Cl.
*B64D 11/06*    (2006.01)
(52) U.S. Cl.
USPC .................. 244/118.6; 244/118.5; 244/122 R

(58) Field of Classification Search
USPC ................................ 244/118.5, 118.6, 122 R
See application file for complete search history.

(56) References Cited

U.S. PATENT DOCUMENTS

| | | | |
|---|---|---|---|
| 4,994,722 A | 2/1991 | Dolan et al. | |
| 6,464,169 B1 | 10/2002 | Johnson et al. | |
| 6,520,451 B1 * | 2/2003 | Moore | 244/118.5 |
| 2004/0227034 A1 | 11/2004 | Wentland et al. | |
| 2006/0065783 A1 | 3/2006 | Mills | |
| 2009/0050738 A1 | 2/2009 | Breuer et al. | |

FOREIGN PATENT DOCUMENTS

| | | |
|---|---|---|
| DE | 102007009863 A1 | 9/2008 |
| EP | 0901964 A2 | 3/1999 |

* cited by examiner

*Primary Examiner* — Timothy D Collins
*Assistant Examiner* — Nicholas McFall
(74) *Attorney, Agent, or Firm* — Lerner, David, Littenberg, Krumholz & Mentlik, LLP

(57) ABSTRACT

The invention relates to a rest compartment arrangement in an aircraft, comprising a rest compartment and at least one monument, wherein the rest compartment is arranged above a cabin floor and comprises a passage that extends from a rest compartment floor in the direction of the cabin floor. When compared to the state of the art, the invention is characterized in that the at least one monument comprises at least one wall which above a seat region situated therein forms a recess to accommodate the passage. As a result of this, monuments can be positioned in a space-saving manner underneath the passage in the cabin without this resulting in reduced comfort, because the recess above the seat region is not perceived to be distracting by the passenger.

10 Claims, 4 Drawing Sheets

Figure 1:
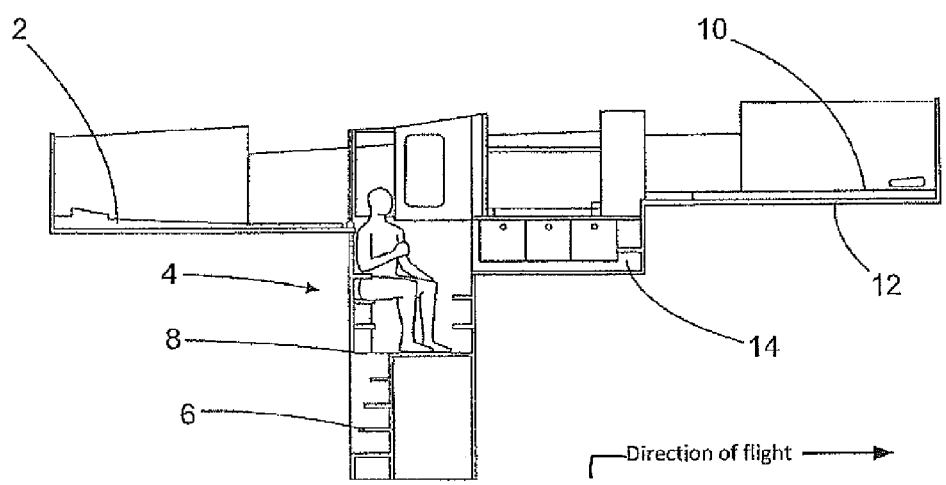

ERGONOMIC AND SPACE-SAVING ARRANGEMENT OF MONUMENTS UNDERNEATH A REST COMPARTMENT IN AN AIRCRAFT

CROSS-REFERENCE TO RELATED APPLICATIONS

The present application is a national phase entry under 35 U.S.C. §371 of International Application No. PCT/EP2009/052861, filed Mar. 11, 2009, published in German, which claims the benefit of the filing date of U.S. Provisional Patent Application No. 61/070,892 filed Mar. 26, 2008 and of German Patent Application No. 10 2008 015 788.0 filed Mar. 26, 2008, the disclosure of which applications is hereby incorporated herein by reference.

TECHNICAL FIELD OF THE INVENTION

The invention relates to a rest compartment arrangement in an aircraft.

TECHNOLOGICAL BACKGROUND OF THE INVENTION

Rest compartments in an aircraft are already well known; in long-haul flights of relatively long flight duration they are used as rest areas by members of the on-board crew. Rest compartments can be positioned at various places within the aircraft, which depends, in particular, on the respective aircraft type or on its size. For example, rest compartments are known that are situated above a passenger cabin and that extend from a region of the cabin ceiling to the top of the aircraft fuselage, as is, for example, shown in EP 0901964. In such overhead rest compartments the arrangement of a narrow and low passage is advantageous so that the crew members who are within the rest compartment can, for example, move from an entrance region to a sleeping region. This passage is arranged between two walls that extend from a floor of the rest compartment downwards in the direction of the cabin. This passage is, for example, arranged in such a manner that a free walking height of up to 1.5 m can be achieved. For this reason the walls at the bottom of the rest compartment, which walls delimit the passage, are relatively pronounced, and consequently the space situated underneath it can hardly be used for installations other than passenger seats or partition walls.

Larger monuments, for example aircraft toilets, which are arranged in centre regions of the cabin and which are designed in the conventional, essentially cuboid, manner, cannot be integrated underneath such a rest compartment because their design heights are such that the passage of the rest compartment would project into toilet compartments situated below it. As a result of this the toilet compartments could only be used with the user stooping therein, which would, however, severely limit passenger comfort within the aircraft cabin.

SUMMARY OF THE INVENTION

It is thus the object of the invention to propose a rest compartment arrangement in an aircraft in which monuments and rest compartments arranged above them can be combined in a particularly ergonomic and space-saving manner, if at all possible without diminishing the ergonomics and the comfort.

This object is met by a rest compartment arrangement with the characteristics of the precharacterising part of claim 1 by the features of the characterising part of claim 1. The rest compartment arrangement according to the invention provides for one or several monuments, designed, for example, in the form of toilets, underneath the rest compartment, wherein the lowered passage of the rest compartment extends above the toilets. To this effect the toilet compartments are constructed in such a manner that each of them comprises a recess or a depression, below which the seat region within the toilet is arranged. Since in the seat region no particularly high ceiling height is required within the toilet, the comfort of a passenger present in the toilet is not diminished as a result of the recess. This idea according to the invention can also apply to an arrangement of several toilets arranged next to each other so that by means of particularly clever nesting of the toilet the lowered passage of the rest compartment can extend above the toilets, while the base area of the toilets need not be increased and the space below the passage can therefore be used particularly well. In the nesting of several toilets it is thus particularly advantageous if the depressions or recesses above the seat regions are arranged next to each other in such a manner that they extend, lined up, below the rest compartment passage. Accordingly, the seat region within a toilet can be designed so as to be relatively narrow so that the width of the toilet wall in the seat region is considerably reduced and consequently comprises, for example, a curved or bevelled shape on the outside. The toilets shaped in this manner can, for example, be arranged next to each other so as to be offset by 180°, so that, for example, two toilets share the smallest possible base area and the seat regions follow on from each other in longitudinal direction of the aircraft. Above the seat regions arranged in this manner there is then a through-section or a through-depression in order to accommodate the passage of the rest compartment arrangement.

Following on from one or several toilets an ascent region to the rest compartment could be arranged, which ascent region comprises, for example, a stair or ladder arrangement which makes it possible for the flight crew to climb into the rest compartment. An unused part within the base area of this ascent region can be used for the stowing of objects, for example trolleys.

As a result of the arrangement of the toilet and the rest compartment according to the invention with a lowered passage it is possible to optimally use the space available in the cabin without, however, diminishing the ergonomics and the comfort. Furthermore, this results in the potential for obtaining additional stowage space, and the monuments within the cabin in the rest compartment region are arranged in a space-saving manner so that the flexibility relating to the cabin design can be improved.

SHORT DESCRIPTION OF THE DRAWINGS

Figure 2:
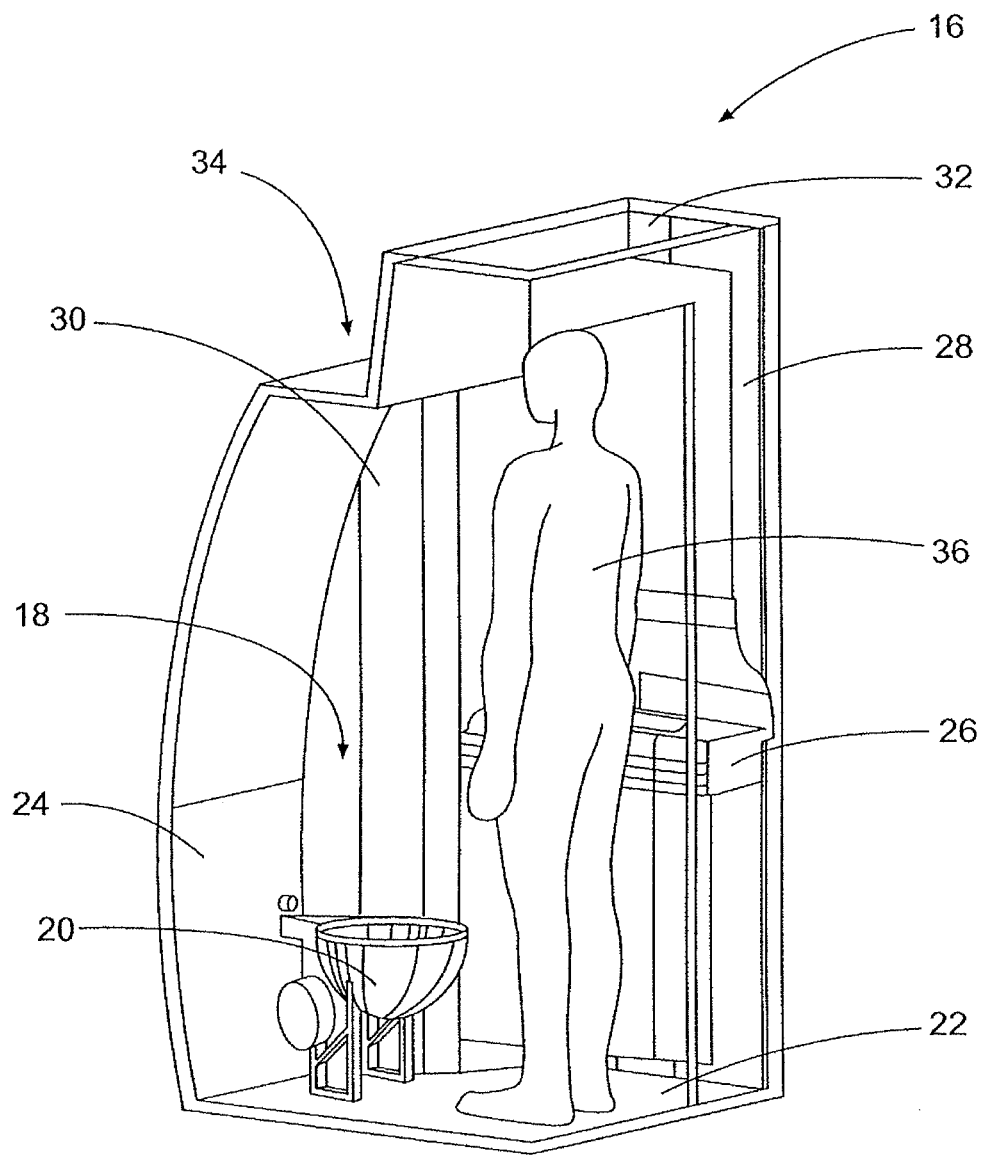
Figure 3A:
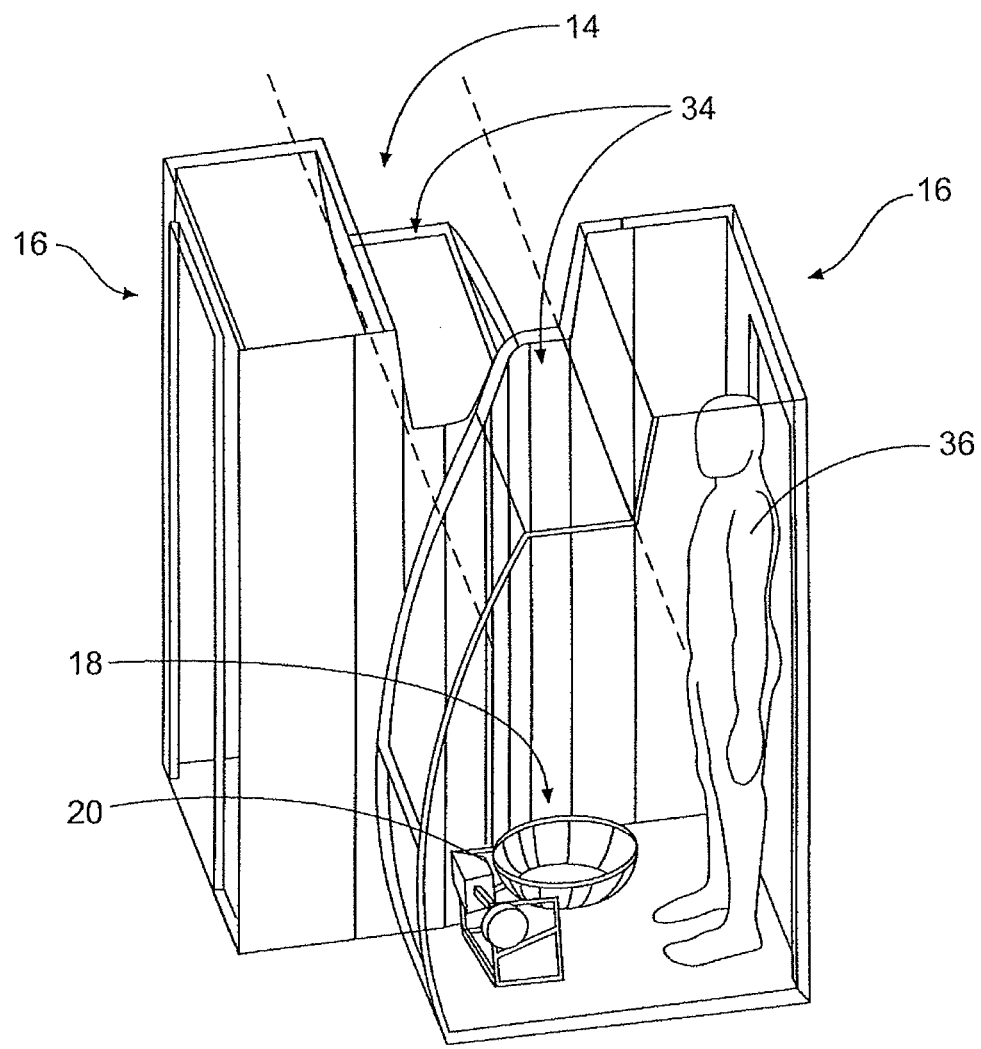
Figure 3B:
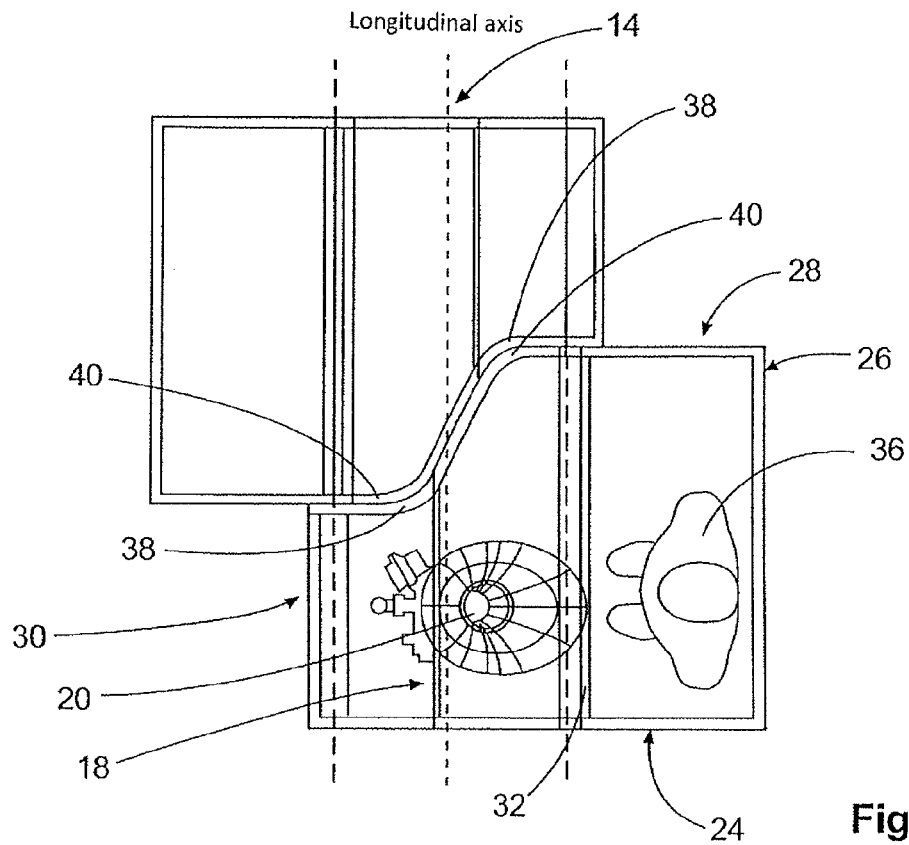
Figure 4:
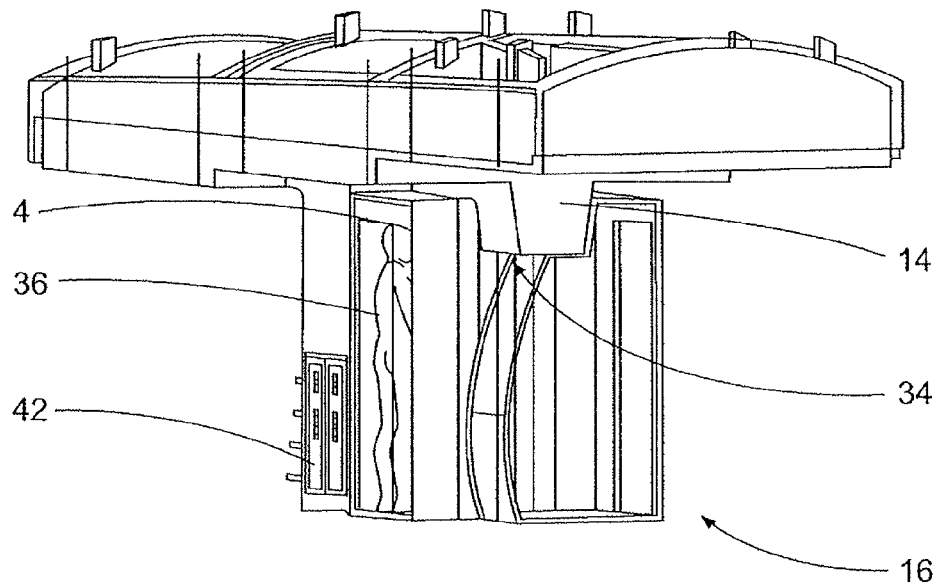

The invention is explained in more detail with reference to figures. Identical objects in the figures have the same reference characters. The following are shown:

FIG. 1: a cross section of a conventional rest compartment arrangement with an ascent and a passage region;

FIG. 2: a three-dimensional view of a toilet according to the idea according to the invention;

FIG. 3a-b: a 3-D view and a top view of two toilets arranged in a nested manner; and FIG. 4: a three-dimensional view of a rest compartment arrangement according to the invention.

DETAILED DESCRIPTION OF EXEMPLARY EMBODIMENTS

FIG. 1 shows a basic principle of a rest compartment in an aircraft cabin. On the left-hand side there is a first berth 2, which can, for example, be reached through an ascent 4 by way of steps 6. The ascent 4 can, for example, comprise an intermediate level 8 below which additional stowage space could be created that is, for example, suitable for accommodating trolleys. On the right-hand side of FIG. 1 a second berth 10 is positioned which can, for example, be reached by way of a passage 14 that is lowered relative to the floor 12. In this arrangement it is possible to walk along the passage 14 in a stooped position in order to reach the second berth 10. Since the passage 14 projects downward into the cabin it is not possible to position conventional toilets in this region because the normal design height of a toilet would require a greater space height than only up to the underside of the passage 14.

For this reason the toilets 16 that are designed as shown in FIG. 2 are provided for the rest compartment arrangement according to the invention. The toilet 16 essentially comprises a seat region 18 with a toilet pan 20 arranged on the floor 22. The floor is surrounded by walls 24, 26, 28, 30 and 32 so that an enclosed toilet compartment is created. At the top of the toilet compartment there is a depression or recess 34, as a result of which each of the walls 24, 28 and 30 comprises a step. This recess 34 is situated directly above the toilet bowl 20 and is used to accommodate at least a region of the lowered passage 14 of the rest compartment arrangement. Since a person 36 when using the toilet bowl 20 is either standing in front of said toilet bowl 20 or is seated on it, there is no need to provide the full room height in the region above the toilet pan 20. For this reason the comfort enjoyed by the person 36 in the region of the toilet bowl 20 is not diminished because the limitation in the region at head height is not perceived to be distracting.

FIGS. 3a and 3b show two toilets 16 that are nested into each other and as a result of the recesses 34 together provide adequate space for a passage 14 underneath a rest compartment. In this arrangement the respective walls 28 of the two toilets are shaped in such a manner that both toilet compartments conform to each other by 180° in a position that the toilet bowls 20 of the two toilet compartments are essentially arranged next to each other, and the recesses 34 situated above them provide an overall width that is adequate for the passage 14. As an example, FIG. 3b shows an S-shaped design of the walls 38. The rounded corners 38 and 40 are arranged in such a manner that at 180° rotation of the two toilet compartments they correspond to each other, and the toilet compartments in the desired arrangement can be positioned next to each other. On the other hand it is also imaginable to create such nesting according to the invention with more than just two toilet compartments, in which, however, the shape of the walls should preferably correspond to each other as far as possible.

Finally, as an example, FIG. 4 shows two toilets 16 with recesses 34 which accommodate a downwards-projecting passage 14 of the rest compartment. The region continuing at the left-hand side beside the toilets 16 provides, for example, the ascent 4, in which it is also possible to create stowage space which, as an example, is illustrated with trolleys parked therein.

The rest compartment arrangement according to the invention provides considerable advantages when compared to rest compartment arrangements from the state of the art. A clever design of the toilets provides the potential for gaining additional stowage space. Furthermore, the monuments within the passenger cabin can be arranged in a space-saving manner, and consequently the available space is optimally used, and the flexibility in the design of the cabin is improved.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

2 First berth
4 Ascent
6 Steps
8 Intermediate level
10 Second berth
12 Floor of the rest compartment
14 Passage of the rest compartment
16 Toilet
18 Seat region
20 Toilet pan
22 Floor of the toilet
24-32 Wall of the toilet
34 Recess
36 Person
38 Rounded corner
40 Rounded corner
42 Trolley

The invention claimed is:

1. A rest compartment arrangement for a cabin of an aircraft, comprising:
    a rest compartment; and
    at least first and second structures, wherein the rest compartment is positioned above the at least first and second structures and comprises a passage extending from a rest compartment floor in a direction of the at least first and second structures,
    wherein the at least first and second structures each comprise at least one wall positioned directly above a seat region situated in each structure, the at least one wall forming a recess for accommodating the passage, and
    wherein the at least first and second structures are positioned next to each other in a way that the recesses are directly adjacent to one another;
    wherein the first and second structures comprises a first and a second wall, respectively;
    wherein said first wall comprises a first curved shape in at least some regions of the first wall;
    wherein said second wall comprises a second curved shape in at least some regions of the second wall;
    wherein the at least first and second structures are nested to one another along the first and second walls such that the first and second curved shapes of the first and second walls conform to one another.

2. The rest compartment arrangement of claim 1, wherein at least one of the first and second structures is an aircraft toilet.

3. The rest compartment arrangement of claim 1, wherein at least one of the first and second structures on one or several sides comprises a shape that at least in some regions is angled or curved, shape conforming to a correspondingly shaped wall of a further structure.

4. The rest compartment arrangement claim 1, wherein at least one of the first and second structures positioned underneath the passage is adjacent to an ascent for entering the rest compartment.

5. The rest compartment arrangement of claim 4, further comprising a stowage space underneath the ascent.

6. The rest compartment arrangement of claim 5, wherein the stowage space is configured to accommodate trolleys.

7. An aircraft comprising:
   a rest compartment; and
   at least first and second structures, wherein the rest compartment is positioned above the at least first and second structures and comprises a passage extending from a rest compartment floor in a direction of the at least first and second structures;
   wherein the at least first and second structures each comprise at least one wall positioned directly above a seat region situated in each structure, the at least one wall forming a recess for accommodating the passage; and
   wherein the at least first and second structures are positioned next to each other in a way that the recesses are directly adjacent to one another;
   wherein the first and second structures comprises a first and a second wall, respectively;
   wherein said first wall comprises a first curved shape in at least some regions of the first wall;
   wherein said second wall comprises a second curved shape in at least some regions of the second wall;
   wherein the at least first and second structures are nested to one another along the first and second walls such that the first and second curved shapes of the first and second walls conform to one another.

8. The rest compartment arrangement of claim 1, wherein the recesses of the at least one walls are adjacent to one another along a longitudinal direction of the aircraft.

9. The rest compartment arrangement of claim 1, wherein the passage extends over the first and second walls.

10. The rest compartment of claim 1, wherein the seat region of the first structure comprises a first seat and the seat region of the second structure comprises a second seat.

\* \* \* \* \*